Oct. 4, 1932.   P. HAGSPIHL   1,880,249

METHOD OF PRODUCING ELECTRODES FOR STORAGE BATTERIES

Filed Jan. 25, 1927

Witnesses:

Inventor:
Paul Hagspihl,

Patented Oct. 4, 1932

1,880,249

UNITED STATES PATENT OFFICE

PAUL HAGSPIHL, OF HAGEN, GERMANY, ASSIGNOR TO THE ELECTRIC STORAGE BATTERY COMPANY, OF PHILADELPHIA, PENNSYLVANIA, A CORPORATION OF NEW JERSEY

METHOD OF PRODUCING ELECTRODES FOR STORAGE BATTERIES

Application filed January 25, 1927, Serial No. 163,434, and in Germany February 13, 1926.

The method of producing electrodes for accumulators having an alkaline electrolyte is known which consists in passing two finely perforated endless bands or strips of metal lengthwise between rollers, filling the channels thus formed with active material and simultaneously uniting the two bands or strips in such manner that a number of parallel disposed pockets are formed in series, with their longer sides parallel to the sides of the band or strip, then uniting the two strips of metal transversely at the ends of the said pockets and finally cutting the united strips at right angles or obliquely into suitable lengths. This method is the subject-matter of the British Patent No. 21,534 of 1905.

A disadvantage of the method described is that comparatively wide webs containing no active material, separate the rows of pockets longitudinally, so that the superficial area of the electrodes is not properly and fully utilized.

According to the present invention this disadvantage is avoided by disposing the pockets contiguous that are produced from endless bands of finely perforated sheeting and filled with active material, the pockets having no separating webs. For this purpose the webs between the pockets in electrodes made according to the known method described are folded in zigzag fashion, whereby the sides of the pockets are brought into close proximity. It is advisable, however, to form the pockets so that their longer sides are arranged transversely on the endless bands.

Figure 1A:
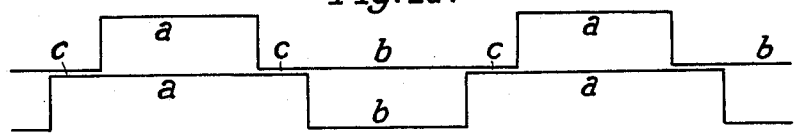
Figure 1B:
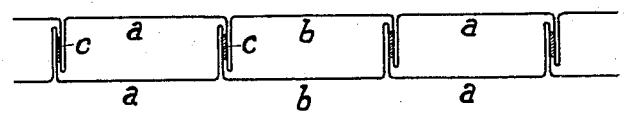
Figure 2A:
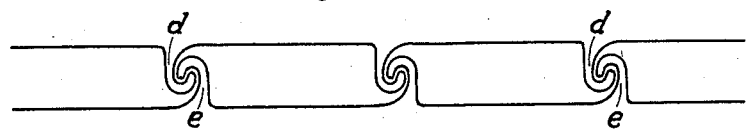
Figure 2B:
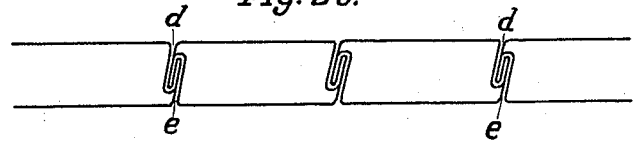

In the accompanying drawing the invention is illustrated by way of example, in which two methods of carrying out the invention are illustrated in longitudinal sections, in which:

Figures 1a and 2a show intermediate stages, and Figures 1b and 2b the final stages of the process.

According to Figure 1a the bands or strips are rolled or pressed to their full width continuously into alternating ridges $a$ and recesses $b$. The ridges of the upper band are narrower and those of the lower band are wider than the recesses of the respective bands. The upper band is then placed upon the lower band in such a manner that the centre line of both the ridges and the recesses of the two bands coincide exactly in the vertical direction. The parts $c$, where the two bands contact, are united by electrical welding or by other similar means, and are then alternately bent upwards and downwards, as shown in Figure 1b, until the parts forming the original ridges and recesses of each band are in alignment, and the pockets thus produced with open ends are practically contiguous along their longitudinal sides.

A second method of attaining the same end is to provide the endless bands in known manner as illustrated in Figure 2a with transverse folds $d$ and $e$, extending over the full width of the bands, which in cross-section have the form of hooks. The hooks $d$ of the one band are bent downwards, whilst the hooks $e$ of the other band are bent upwards. These two bands are then laterally forced together, so that the hooks engage in each other as shown in Figure 2a. Then, finally, by means of rollers or other means, the folds $e$ and $d$ are firmly pressed together and result in a series of pockets, open at both ends, as shown in Figure 2b, the longitudinal sides of which are practically contiguous.

The pockets produced in one of the methods described are advantageously filled by the introduction from the side of the bands of prepared blocks of active material. A suitable number of the filled pockets to form an electrode are then cut off, and the open ends or sides closed by channel strips of U cross-section, and provided with current carrying lugs. Electrodes of greater width can be made by arranging in known manner several rows of pockets side by side and connecting them together by means of double-channel strips.

What I claim as my invention is:—

1. A method of producing pocketed supports for storage battery plates which consists in offsetting a strip to provide ridges narrower than the recesses between them, arranging two such strips in opposed relation with the center lines of the recesses and of the ridges in substantial alignment to provide overlapping flat portions, and flat folding the overlapping portions of the two strips to provide substantially contiguous side walls for the pockets.

2. A method of producing pocketed supports for storage battery plates which consists in offsetting a strip to provide ridges narrower than the recesses between them, arranging two such strips in opposed relation with the center lines of the recesses and of the ridges in substantial alignment to provide overlapping flat portions, and flat folding and interhooking the overlapping portions of the two strips to provide substantially contiguous side walls for the pockets.

In testimony whereof I affix my signature.

PAUL HAGSPIHL.